United States Patent [19]
Rahman et al.

[11] Patent Number: 6,167,250
[45] Date of Patent: Dec. 26, 2000

[54] NETWORK BASED TARIFF ACQUISITION SYSTEM FOR ROAMING MOBILE SUBSCRIBERS

[75] Inventors: Tariq Rahman, Spønga; Laurence McDonald, Uppsala, both of Sweden

[73] Assignee: Telefonaktiebolaget LM Ericsson (publ), Stockholm, Sweden

[21] Appl. No.: 08/936,527

[22] Filed: Sep. 24, 1997

[51] Int. Cl.[7] .................................................. H04Q 7/20
[52] U.S. Cl. ......................... 455/406; 455/407; 455/408
[58] Field of Search .................................. 455/406, 407, 455/408, 409, 435, 433

[56] References Cited

U.S. PATENT DOCUMENTS

| | | | |
|---|---|---|---|
| 5,420,914 | 5/1995 | Blumhardt | 379/114 |
| 5,586,338 | 12/1996 | Lynch et al. | 455/34.1 |
| 5,659,601 | 8/1997 | Cheslog | 455/406 |
| 5,749,052 | 5/1998 | Hidem et al. | 455/406 |
| 5,764,741 | 6/1998 | Barak | 379/114 |
| 5,796,790 | 8/1998 | Brunner | 455/433 |
| 5,819,178 | 10/1998 | Cropper | 455/433 |
| 5,848,138 | 12/1998 | Sarpola et al. | 455/406 |
| 5,862,471 | 1/1999 | Tiedemann, Jr. et al. | 455/406 |
| 5,915,214 | 6/1999 | Reece et al. | 455/406 |

FOREIGN PATENT DOCUMENTS

| | | |
|---|---|---|
| 724371 | 7/1996 | European Pat. Off. . |
| 94/28683 | 12/1994 | WIPO . |
| 96/24226 | 8/1996 | WIPO . |
| 97/30561 | 8/1997 | WIPO . |

*Primary Examiner*—Daniel S. Hunter
*Assistant Examiner*—Thuan T. Nguyen
*Attorney, Agent, or Firm*—Burns, Doane, Swecker & Mathis, L.L.P.

[57] ABSTRACT

A method of obtaining tariff rates on a plurality of candidate service providers accessible to a roaming mobile subscriber for use in choosing the most suitable candidate service provider in a visited area. The method includes initiating registration by the mobile subscriber to a first candidate service provider. A request for subscriber's profile information is made by the first candidate service provider to the subscriber's home service provider. Additionally, the first candidate service provider sends the intended tariff rate to be charged to the subscriber to the home provider. The home provider determines which other candidate providers are accessible by the subscriber and requests tariff information regarding these providers. The home provider may then determine the most suitable provider based on the received tariff information e.g. the lowest tariff. If the provider of the currently pending registration is determined to be the most suitable, the registration process continues and the subscriber remains registered with the first candidate service provider. If on the other hand a second candidate service provider is most suitable, the home provider notifies the subscriber of this information via an SMS message, for example. The subscriber can then register with the appropriate provider either manually or automatically in response to the notification.

24 Claims, 3 Drawing Sheets

NETWORK BASED TARIFF ACQUISITION SYSTEM FOR ROAMING MOBILE SUBSCRIBERS

FIELD OF THE INVENTION

The present invention relates generally to tariff information for wireless services charged by mobile service providers. More specifically, the invention pertains to a method of obtaining tariff information from candidate service providers accessible by roaming mobile subscribers.

BACKGROUND OF THE INVENTION

The sharp increase in demand over the years for wireless services highlights a growing trend of general acceptance for this mode of communication. At the present time, customers obtain wireless service by subscribing with a service provider in their home service area. The home service area is a geographic area in which the subscriber anticipates making the majority of his/her calls, typically at more favorable tariff rates. As wireless communication becomes more prevalent in society, an important aspect that will determine its general acceptance as a universal communication tool is the ability for subscribers to access services irrespective of their location. Given this requisite desire, many independent operators have been compelled to cooperate by forming roaming agreements that permit subscribers to access services of other providers.

Presently, subscribers wishing to access services while roaming into a visiting area must first register with a visiting provider. Access is then allowed if the subscriber's home service provider has a roaming agreement with the visiting provider. Typically, the tariff rates applied to roaming subscribers are generally higher than those applied in the home area since many service providers tack on surcharges to roaming subscribers who access their systems. One of the problems with the current scheme is that it is difficult for subscribers to know precisely what the tariff rate is being charged while accessing services and how that compares with competing providers in an unfamiliar area. This problem is exacerbated by the fact that tariff rates may change frequently due to competitive pressures and in response to dynamic factors such as current traffic load etc. Furthermore, subscribers may be unaware of the terms stipulated in the roaming agreements negotiated by their home providers thus adding to the price uncertainty. Consequently, in the current competitive environment where there may be as many as four, five or more providers in a geographic area, there currently exists no easy way for subscribers to obtain tariff information in order to choose, for example, the lowest cost provider. It should be noted that the notion of obtaining "tariff information" is used interchangeably with obtaining "tariff rates" in the subsequent description.

In view of the foregoing, it is an objective of the present invention to provide a method for obtaining tariff information charged by wireless service providers to mobile subscribers that is relatively efficient and convenient.

SUMMARY OF THE INVENTION

Briefly described, and in accordance with embodiments thereof, the invention discloses a method of obtaining tariff information charged by candidate service providers that are accessible to a mobile subscriber. The method includes initiating registration with a first candidate service provider by the mobile subscriber. The first candidate provider subsequently requests an information profile on the subscriber from the subscriber's home service provider. Additionally, the intended tariff rate to be charged to the subscriber is sent with the profile request to the home provider. The home provider determines which other potential candidate service providers are accessible to the subscriber in the area. The home provider then requests for the tariff rates that the other candidate providers would charge the subscriber. This could be done by requesting for tariff information directly from each of the candidate providers or by accessing a tariff information node containing a comprehensive listing of such tariff information. Upon receipt of the tariff information, the home provider may determine the most suitable candidate provider. Alternatively, another option at this point would be to have all tariff information transmitted directly to the mobile terminal so that the subscriber can manually determine the most suitable provider. The determination of suitability may be based on the lowest tariff rate or some other predetermined criteria. If the provider of the currently pending registration is determined to be the most suitable by the home provider, the subscriber maintains registration with this provider. On the other hand, if another candidate provider is deemed more suitable by the home provider, the subscriber is notified of this information, for example, via an SMS message. The subscriber can then register with the appropriate provider by programming his/her terminal to automatically initiate registration in response to and in accordance with the notification message.

The present invention permits mobile subscribers to acquire tariff information in a visiting service area that allows them to be reasonably sure that they are accessing the most suitable provider. The process of the present invention is efficient, transparent and does not necessarily require involvement by the subscriber. The invention is especially useful in notifying roaming subscribers of suitable providers and their associated tariff rates when operating in an unfamiliar location.

BRIEF DESCRIPTION OF THE DRAWINGS

The invention, together with further objects and advantages thereof, may best be understood by reference to the following description taken in conjunction with the accompanying drawings in which.

DETAILED DESCRIPTION OF THE PREFERRED EMBODIMENTS

In a basic cellular telecommunication system, a mobile switching center (MSC) is linked to a plurality of base stations by a series of digital transmission links. The base stations are geographically dispersed to form an area of coverage for the system. Each base station (BS) is designated to cover a specified area, known as a cell, in which two way radio communication can take place between a mobile terminal and the BS in the associated cell. A description of a network based tariff acquisition system operating in accordance with the present invention follows.

Figure 1:
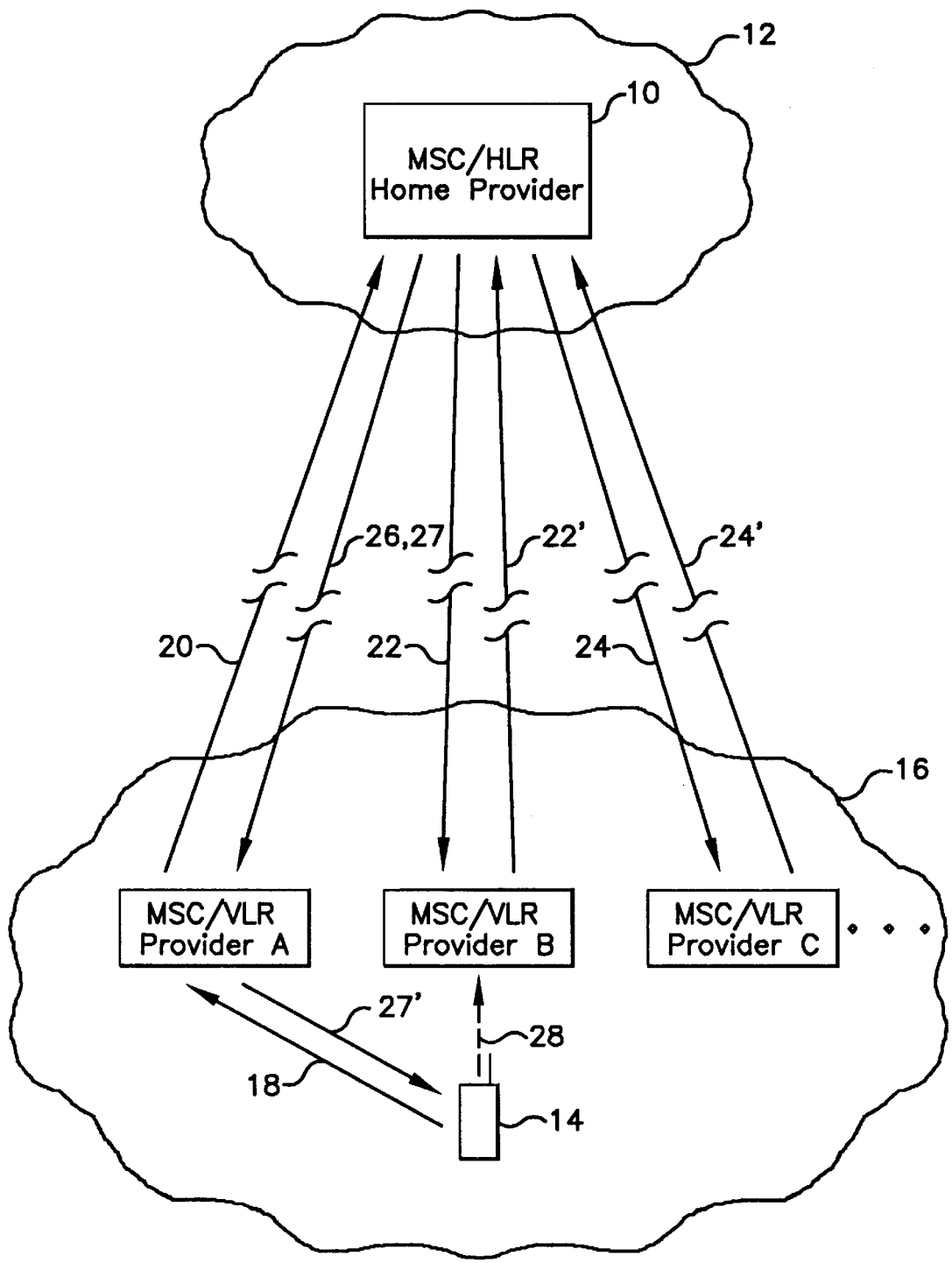
FIG. 1 illustrates a network based tariff acquisition system operating in accordance with a first embodiment of the present invention.

FIG. 1 illustrates an network based tariff acquisition system operating in accordance with a first embodiment of the present invention. For simplicity, the associated base stations are not shown. A subscriber represented by mobile terminal (MT) 14 is a home subscriber of wireless services provisioned by a home service provider 10 in its associated home area 12. Subscriber 14 is shown to be roaming in a visiting area 16. Visiting area 16 may contain a plurality of service providers, such as provider A, provider B, and provider C, each providing substantially similar service and coverage in area 16. Furthermore, the individual providers A, B, and C may be operating in accordance with any of a variety of wireless standards such as Digital Advanced Mobile Phone System (D-AMPS 800), Global System for Mobile Communication (GSM 1900), and D-AMPS 1900 respectively, for example. In the preferred embodiment, MT 14 is capable of multi-standard and multi-band operation in order to potentially access a wide number of candidate networks.

In telecommunication systems operating in accordance with Digital Advanced Mobile Phone System (D-AMPS), for example, calls initiated from an MT undergo a procedure referred to as "registration" in order to access service. Registration is used by the MSC to keep track of MTs active in its service area. In the case of a roaming MT switched on in a visiting service area, the visited MSC determines the identity of the subscriber from information transmitted during the registration request. Such subscriber identification may, for example, be determined from a mobile identification number (MIN) transmitted over a radio control channel. Those skilled in the art will appreciate that various procedures or protocols for subscriber identification may occur in systems operating in accordance with different standards. Therefore the invention may be adapted to work within the procedures of the prevailing standard to uniquely identify a subscriber e.g. the international mobile subscriber identity (IMSI) used in Global System for Mobile Communication (GSM) systems. The control channel provides the necessary communication and signaling between the MT and the MSC when the MT is not in conversation such as during paging and access procedures. In using the control channel, the MSC can then determine if the requesting terminal is a roaming MT and can therefore initiate the appropriate registration procedure.

In the exemplary implementation in FIG. 1, MT 14 signals 18 to initiate registration with, for example, provider A who then identifies MT 14 as a roaming terminal through standard methods. Typically when a roaming MT is detected by a visited MSC, the MIN is logged into a visitor location register (VLR) of provider A. The MSC/VLR of provider A then sends a request 20 to the home location register (HLR) of the subscriber's home service provider 10 for subscriber information by signaling through the widely used signaling system No. 7 (SS7) network (not shown). The subscriber information obtained from the home provider typically includes the subscriber's profile and is used by provider A to determine whether service should be granted to the visiting subscriber, since information such as credit standing, payment history, and service level etc. may typically be included in the profile.

Appended to the profile request 20 from provider A is the tariff rate it intends to charge subscriber 14. Upon reception of the profile request 20 and intended tariff rate, the home service provider 10 stores the intended tariff rate and checks in the subscriber's record as to what other bands and standards the subscriber is capable of accessing. The home service provider 10 then checks a predetermined internal database for candidate systems operating on other bands and standards in the same geographic area that are accessible by subscriber 14. Subsequently, the home service provider 10 makes tariff requests 22 and 24 directly to candidate providers B and C respectively, who were determined to be accessible by subscriber 14.

Tariff requests 22 and 24 are made via a new message adapted to function in accordance with the prevailing standard such a D-AMPS, for example. Providers B and C both independently return their proposed tariff rates for the potential subscriber 14 via 22' and 24' to home service provider 10. When the tariff rates from all of the candidate providers are received, the home provider 10 may then determine the most suitable provider based on the tariff information. The suitability may be based on the lowest tariff or some other predetermined criteria set by subscriber 14, such as preference for a particular service offered by a specific provider, for example. If the originally accessed provider (provider A) is determined to be the most suitable, the home provider 10 accepts the original subscriber information request from provider A and sends back the appropriate data and authorization 26 so that the pending registration is permitted to continue through normal procedures. If it is determined that an alternative provider is the most suitable, home provider 10 will notify the subscriber 14 of this information by, e.g., initiating a short message service (SMS message) by signaling via provider A through signals 27 and 27'.

The SMS message contains the details of the alternative provider such as identification and proposed tariff rate. Subscriber 14 can then cancel the current registration and manually initiate registration 28 with the proposed suitable alternative provider (e.g. provider B). Furthermore, the subscriber may optionally program his/her terminal to automatically initiate registration with the provider in response to the SMS message. Alternatively, the subscriber may request the tariff information accumulated by home provider 10 on the candidate providers to be transmitted to the mobile terminal at any time via an SMS message if, for example, the subscriber wishes to determine the most suitable provider manually or if he/she simply desires to compare tariff rates.

Figure 2:
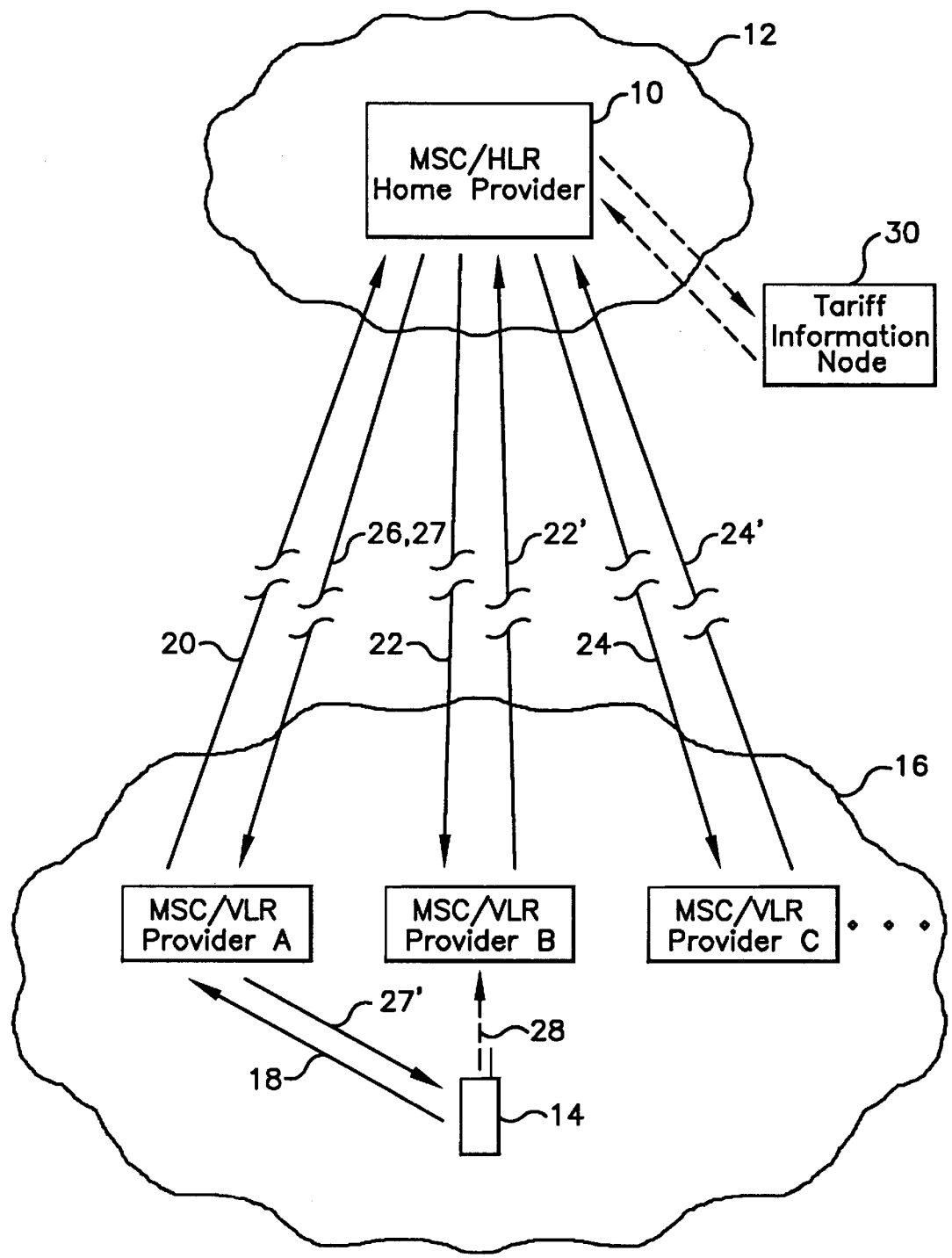
FIG. 2 illustrates a network based tariff acquisition system operating in accordance with a second embodiment of the present invention.

FIG. 2 illustrates a network based tariff acquisition system operating in accordance with a second embodiment of the present invention. In an exemplary implementation of the second embodiment, a roaming subscriber 14 initiates registration with provider A in visiting area 16. Provider A then signals a request for profile information relating to subscriber 14 to the MSC/HLR of home provider 10. Included with the request is the intended tariff rate to be charged by provider A to subscriber 14. The MSC/HLR of home provider 10 then determines which other providers are potentially accessible by subscriber 14 in the local geographic area.

Following the determination of the candidate providers (e.g. providers B and C), home provider 10 seeks to obtain the proposed tariff rates charged by these providers. At this point the MSC/HLR of home provider 10 has the option to perform individual tariff request directly to providers B or C or may request this information from a centralized tariff information node 30 that contains tariff information on all participating candidate providers. The MSC/HLR of home provider 10 may elect to obtain tariff information from node 30 when, for example, any of the candidate providers B or C are not configured for or not capable of responding to tariff requests 22 or 24.

Figure 3:
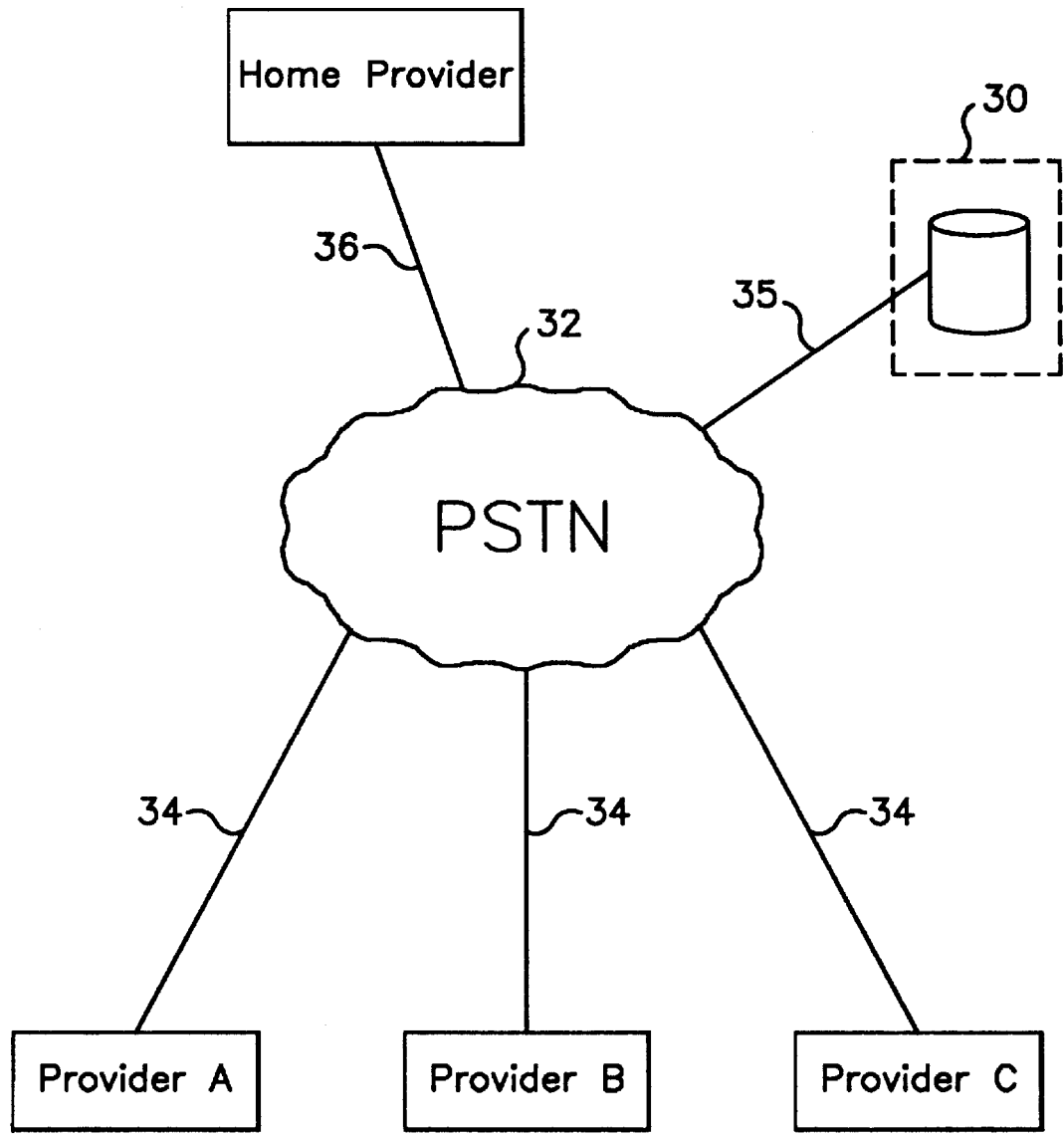
FIG. 3 is an exemplary tariff information node for use with the second embodiment of the present invention.

FIG. 3 illustrates a tariff information node 30 that can be used with the second embodiment of the present invention. The participating service providers are connected to tariff information node 30 through links 34 to the public switched telephone network (PSTN) 32. Similarly, tariff information node 30 is connected to the PSTN through link 35. Connection to tariff information node 30 via the PSTN 32 permits the participating providers to easily update their tariff information. The requesting home provider 10 (FIG. 2) is likewise connected through link 36 via the PSTN 32 to tariff information node 30. For tariff information node 30 to be the most useful, all potential service providers would participate to be listed on node 30. The stored tariff information can then be available to anyone who desires such information in which the tariff information node 30 may be operated and maintained by a third party. Providers will be compelled to participate due to competitive and marketplace pressures from customers desiring access to this information.

Once the tariff information from the candidate providers are retrieved from tariff information node 30, the MSC/HLR of home provider 10 determines the most suitable provider with respect to a predetermined criteria such as lowest cost, for example. If the provider of the currently pending registration is determined to be the most suitable, i.e. provider A, home provider 10 returns the appropriate authorization to allow the registration to proceed. In this case, the determination of provider A being the most suitable is transparent to subscriber 14. On the other hand if an alternative candidate provider is deemed more suitable, the MSC/HLR of the home provider 10 initiates an SMS message to notify the subscriber 14 of such information. Subscriber 14 can then register with the appropriate suitable provider either automatically or manually in accordance with the aforementioned description.

The present invention permits subscribers to acquire tariff information in a service area, home or otherwise, that allows them to be reasonably sure that they are accessing the most suitable provider. The invention is especially useful for roaming subscribers where tariff rates in an unfamiliar market are not readily known, since the investigation of tariff information on potentially accessible providers is often desirable in a competitive market. Correspondingly, the present invention provides an efficient and transparent tariff acquisition method that does not necessarily require involvement from the subscriber. Additionally, the invention provides a potential revenue generating feature to providers that is also beneficial to subscribers.

It will be appreciated by those skilled in the art that changes could be made to the embodiments described above without departing from the broad inventive concept thereof. It should be understood that the invention is not limited to the particular embodiments disclosed, but it is intended to cover modifications within the spirit and scope of the invention as defined in the appended claims.

What is claimed is:

1. A method of obtaining tariff rates charged by at least two candidate wireless service providers accessible by a mobile terminal, said method comprising the steps of:
   registering with a first candidate service provider by said mobile terminal;
   transmitting a request for subscriber information together with the intended tariff rate charged by said first candidate service provider to said mobile terminal's associated home service provider;
   determining at least one second candidate service provider that is accessible by said mobile terminal; and
   obtaining tariff rates from said at least one second candidate service provider by said home service provider.

2. A method according to claim 1 wherein said registering step with said first candidate service provider proceeds in accordance with registration procedures defined in the Digital Advanced Mobile Phone System (D-AMPS) standard.

3. A method according to claim 1 wherein said determining at least a second candidate service provider step is performed by the home service provider.

4. A method according to claim 1 further comprises the step of selecting a candidate service provider based on said obtained tariff rates from said at least one second candidate service provider and said intended tariff rate charged by said first candidate service provider, and wherein said selection is performed by the home service provider.

5. A method according to claim 4 wherein said selected candidate service provider is chosen based on a lowest tariff rate.

6. A method according to claim 1 further comprising the step of transmitting said tariff rates on said first and said at least second candidate service providers from the home service provider to the mobile terminal via a short message service (SMS) message.

7. A method according to claim 6 further comprises the step of the mobile terminal selecting a candidate service provider based on the transmitted tariff rates.

8. A method of selecting a wireless service provider based on obtained tariff rates from a plurality of candidate wireless service providers accessible to a roaming mobile subscriber, said method comprising the steps of:
   initiating registration with a first candidate service provider by said mobile subscriber;
   transmitting a request for subscriber information together with the intended tariff rate charged by said first candidate service provider to said subscriber's home service provider;
   determining a list of candidate service providers that are accessible by said subscriber;
   obtaining tariff rates charged by said listed candidate service providers; and
   selecting a service provider based on said obtained tariff rates and said transmitted intended tariff charged by said first candidate service provider.

9. A method according to claim 8 wherein said initiating registration step proceeds in accordance with registration procedures defined in Digital Advanced Mobile Phone System (D-AMPS).

10. A method according to claim 8 wherein said candidate providers are determined from a predetermined list.

11. A method according to claim 8 wherein said home service provider obtains tariff rates charged by the candidate service providers by individually requesting such information from each candidate service provider.

12. A method according to claim 8 wherein said home service provider obtains tariff rates charged by the candidate service providers from a tariff information node.

13. A method according to claim 8 wherein said selected provider is determined by the lowest tariff rate charged.

14. A method according to claim 8 wherein said subscriber is notified of the selected service provider by a short message service (SMS) message via said first candidate service provider.

15. A method according to claim 14 wherein said subscriber manually registers with the selected service provider.

16. A method according to claim 14 wherein said subscriber's mobile terminal automatically registers with the selected service provider upon receipt of and in accordance with the notification message.

17. A method according to claim 8 wherein said candidate service providers are operating in accordance with different standards.

18. A method according to claim 8 wherein the mobile subscriber registers with the selected candidate service provider.

19. A system for obtaining tariff rates charged by at least two candidate wireless service providers comprising:
- a mobile terminal capable of transmitting and receiving voice and data;
- a first candidate wireless service provider having means for transmitting a request for subscriber information together with an intended first tariff rate charged for said mobile terminal;
- at least one second candidate wireless service provider having means for transmitting an intended second tariff rate charged for said mobile terminal; and
- a home service provider associated with said mobile terminal having means for receiving said request for subscriber information and said first tariff rate from said first candidate service provider, means for determining if said at least one second candidate service provider is accessible by said mobile terminal, and means for receiving said second tariff rate from said at least one second candidate service provider.

20. A system according to claim 19 wherein said mobile terminal is capable of multi-standard operation.

21. A system according to claim 19 wherein said means for transmitting a request for subscriber information proceeds in accordance with procedures defined in the Digital Advanced Mobile Phone System (D-AMPS) standard.

22. A system according to claim 19 wherein said means for transmitting a second tariff rate by direct transmission via the public switched telephone network (PSTN) from the second candidate provider to the home service provider.

23. A system according to claim 19 wherein said means for transmitting a second tariff rate occurs via data transmitted by a tariff information node.

24. A system according to claim 19 wherein said means for determining if said second candidate service provider is accessible by said mobile terminal occurs by searching a predetermined database.

* * * * *